US 6,899,475 B2

(12) United States Patent
Walton

(10) Patent No.: US 6,899,475 B2
(45) Date of Patent: May 31, 2005

(54) WATERMARKING A PAGE DESCRIPTION LANGUAGE FILE

(75) Inventor: Scott E Walton, Salem, OR (US)

(73) Assignee: Digimarc Corporation, Beaverton, OR (US)

( * ) Notice: Subject to any disclaimer, the term of this patent is extended or adjusted under 35 U.S.C. 154(b) by 421 days.

(21) Appl. No.: 10/066,116

(22) Filed: Jan. 30, 2002

(65) Prior Publication Data

US 2003/0142361 A1 Jul. 31, 2003

(51) Int. Cl.$^7$ .................................................. B41J 5/30
(52) U.S. Cl. ........................... 400/62; 400/61; 400/76; 358/3.28
(58) Field of Search ............................... 400/61, 62, 70, 400/76; 101/483; 382/100, 232, 282, 283; 380/54; 283/113; 358/3.28; 713/176; 235/494

(56) References Cited

U.S. PATENT DOCUMENTS

| 5,091,966 | A | | 2/1992 | Bloomberg |
| 5,509,074 | A | | 4/1996 | Choudhury |
| 5,713,032 | A | | 1/1998 | Spencer |
| 5,772,250 | A | | 6/1998 | Gasper |
| 5,778,102 | A | | 7/1998 | Sandford, II |
| 5,905,800 | A | * | 5/1999 | Moskowitz et al. .......... 380/28 |
| 5,919,730 | A | | 7/1999 | Gasper |
| 6,064,764 | A | * | 5/2000 | Bhaskaran et al. ......... 382/183 |
| 6,086,706 | A | | 7/2000 | Brassil |
| 6,122,403 | A | | 9/2000 | Rhoads |
| 6,332,149 | B1 | | 12/2001 | Warmus |
| 6,334,721 | B1 | | 1/2002 | Horigane |
| 6,343,204 | B1 | | 1/2002 | Yang |
| 6,345,104 | B1 | | 2/2002 | Rhoads |
| 6,351,815 | B1 | | 2/2002 | Adams |
| 6,396,594 | B1 | | 5/2002 | French |
| 6,457,883 | B1 | * | 10/2002 | Silverbrook et al. .......... 400/62 |

(Continued)

FOREIGN PATENT DOCUMENTS

| EP | 493091 | 7/1992 |
| EP | 1156662 | 7/2000 |
| JP | 8-50598 | 2/1996 |
| WO | WO 9740619 | 10/1997 |
| WO | WO 01/74053 | 10/2001 |
| WO | WO 02/03328 | 1/2002 |
| WO | WO 0225599 | 3/2002 |

OTHER PUBLICATIONS

U.S. Appl. No. 10/792,400, Rhoads, filed Mar. 2, 2004.
U.S. Appl. No. 10/639,598, Perry, filed Aug. 11, 2003.

(Continued)

Primary Examiner—Minh H Chau
(74) Attorney, Agent, or Firm—Digimarc Corporation

(57) ABSTRACT

The present invention provides a method and system for watermarking a file which is in a PDL such as PostScript. The present invention can be used to either watermark a PDL file and then generate a watermarked PDL file or the present invention can be part of the Interpreter in a printer which takes a file in a PDL and which then generates watermarked raster images which are printed.

The present invention includes an "interpreter" which generates raster images from the PDL file. The raster images are then watermarked using conventional watermarking techniques. Next the raster images are either printed (if the interpreter is part of a printer) or the raster images are combined into a new PDL file.

17 Claims, 5 Drawing Sheets

U.S. PATENT DOCUMENTS

| | | |
|---|---|---|
| 6,538,763 B1 | 3/2003 | Klosterman |
| 6,549,638 B2 | 4/2003 | Davis |
| 6,636,613 B1 | 10/2003 | Schwenk |
| 6,681,029 B1 | 1/2004 | Rhoads |
| 6,694,042 B2 | 2/2004 | Seder |
| 6,694,043 B2 | 2/2004 | Seder |
| 2001/0006551 A1 | 7/2001 | Masaki |
| 2001/0006585 A1 | 7/2001 | Horigane |
| 2001/0007130 A1 | 7/2001 | Takaragi |
| 2001/0017704 A1 | 8/2001 | Akiyama |
| 2001/0017709 A1 | 8/2001 | Murakami |
| 2001/0023421 A1 | 9/2001 | Numao |
| 2001/0030759 A1 | 10/2001 | Hayashi |
| 2001/0053299 A1 | 12/2001 | Matsunoshita |
| 2001/0054150 A1 * | 12/2001 | Levy .......................... 713/176 |
| 2002/0012444 A1 | 1/2002 | Nishikawa |
| 2002/0018223 A1 | 2/2002 | Kashihara |
| 2002/0048369 A1 | 4/2002 | Ginter |
| 2002/0054317 A1 | 5/2002 | Matsunoshita |
| 2002/0064303 A1 | 5/2002 | Fuss |
| 2002/0064304 A1 | 5/2002 | Fuss |
| 2002/0106102 A1 | 8/2002 | Au |
| 2002/0112171 A1 | 8/2002 | Ginter |
| 2002/0168089 A1 | 11/2002 | Guenther |
| 2003/0077096 A1 | 4/2003 | Potter |
| 2003/0165253 A1 * | 9/2003 | Simpson et al. ............ 382/100 |
| 2003/0231785 A1 | 12/2003 | Rhoads |

OTHER PUBLICATIONS

U.S. Appl. No. 09/694,465, Rodriguez, filed Oct. 23, 2000.
U.S. Appl. No. 09/465,418, Rhoads, filed Dec. 16, 1999.
Bloomberg, "Embedding Digital Data on Paper in Iconic Text," SPIE, vol. 3027, pp. 67–80 (1997).
Brassil, "Electronic Marking and Identification Techniques," Proc. Of INFOCOM/94 Conf on Computer, IEEE Commun. Soc Conference, pp. 1278–1287 (1994).
Brassil, "Hiding Information in Document Images," Proceedings of the 1995 Conference on Information Sciences and Systems, pp. 482–489 (1995).
Koch, "Copyright Protection for Multimedia Data," Proc. Of the Int. Conf. On Digital Media and Electronic Publishing, Leeds, U.K., 15 pages (1994).
Merz, "Ghostscript User Manual," chapters 1–6 (1997).
Zhao, "Embedding Robust Labels into Images for Copyright Protection," Proc. Of the International Congress on Intellectual Property Rights for Specialized Information, Knowledge and New Technologies, 10 pages (1995).

* cited by examiner

WATERMARKING A PAGE DESCRIPTION LANGUAGE FILE

FIELD OF THE INVENTION

The present invention relates to computer technology and more particularly to digital watermarking technology.

BACKGROUND

A printed page may include graphics, text and images. The graphics, text and images on a page are positioned at specific places on the page to provide a desired effect. A page description language (PDL) is generally used to provide instructions to a printer concerning how the graphics, text and images should be positioned on a page.

In most situations, an "interpreter" in the printer accepts the instructions provided by the PDL along with the necessary graphic, text and image objects. The interpreter generates appropriate raster image files to position of the ink dots which will form the desired printed page. PostScript™ which was developed by Adobe Systems Corporation is the most widely used PDL; however, there are many other PDLs that have been defined.

The page layout program PageMaker™ marketed by Adobe Systems Corporation is in widespread use to generate PostScript files. While the PageMaker program is in widespread use there are also are other somewhat similar programs such as those marketed under the trademarks "Quark Express" and "InDesign".

A number of available interpreters take PostScript files and generate the raster images required by printers. One such interpreter is marketed by Adobe Systems. Another such interpreter is marketed under the trademark "PhonenixPage" by Xionics Document Technologies. Still another PostScript interpreter called "Ghostscript™" is freely available at various internet sites under the "Aladdin Ghostscript Free Public License".

Programs that can insert digital watermarks into images are in widespread use. For example the widely used image editing program "Photoshop™" includes a mechanism for inserting a watermark into an image.

SUMMARY OF THE PRESENT INVENTION

The present invention provides a method and system for watermarking a file which is in a PDL such as PostScript. The present invention can be used to either watermark a PDL file and then generate a watermarked PDL file or the present invention can be part of the interpreter in a printer which takes a file in a PDL and which then generates watermarked raster images which are printed.

The present invention includes an "interpreter" which generates raster images from the PDL file. The raster images are then watermarked using conventional watermarking techniques. Next the raster images are either printed (if the interpreter is part of a printer) or the raster images are combined into a new PDL file.

The specific embodiment shown relates to a PostScript file; however, it should be understood that the invention can also be applied to files in other page description languages. PostScript is merely used as an example.

DESCRIPTION OF PREFERRED EMBODIMENT

The preferred embodiment of the present invention provides a method and system for watermarking a PostScript file. Due to its construction and format, a file in a PDL such as PostScript can not be watermarked using the conventional watermarking programs such as that which is part of the Photoshop program. The preferred embodiment of the present invention is directed to watermarking a PostScript file; however, it should be understood that the invention can also be used to watermark files in various other PDL languages.

The preferred embodiment utilizes elements from the Ghostscript interpreter. The source code for the Ghostscript interpreter is freely available at various internet web sites under the "Aladdin Ghostscript Free Public License". It should be understood that while the preferred embodiment utilizes the Ghostscript interpreter, the invention can be used with other PostScript interpreters and with other PDLs.

Figure 1:
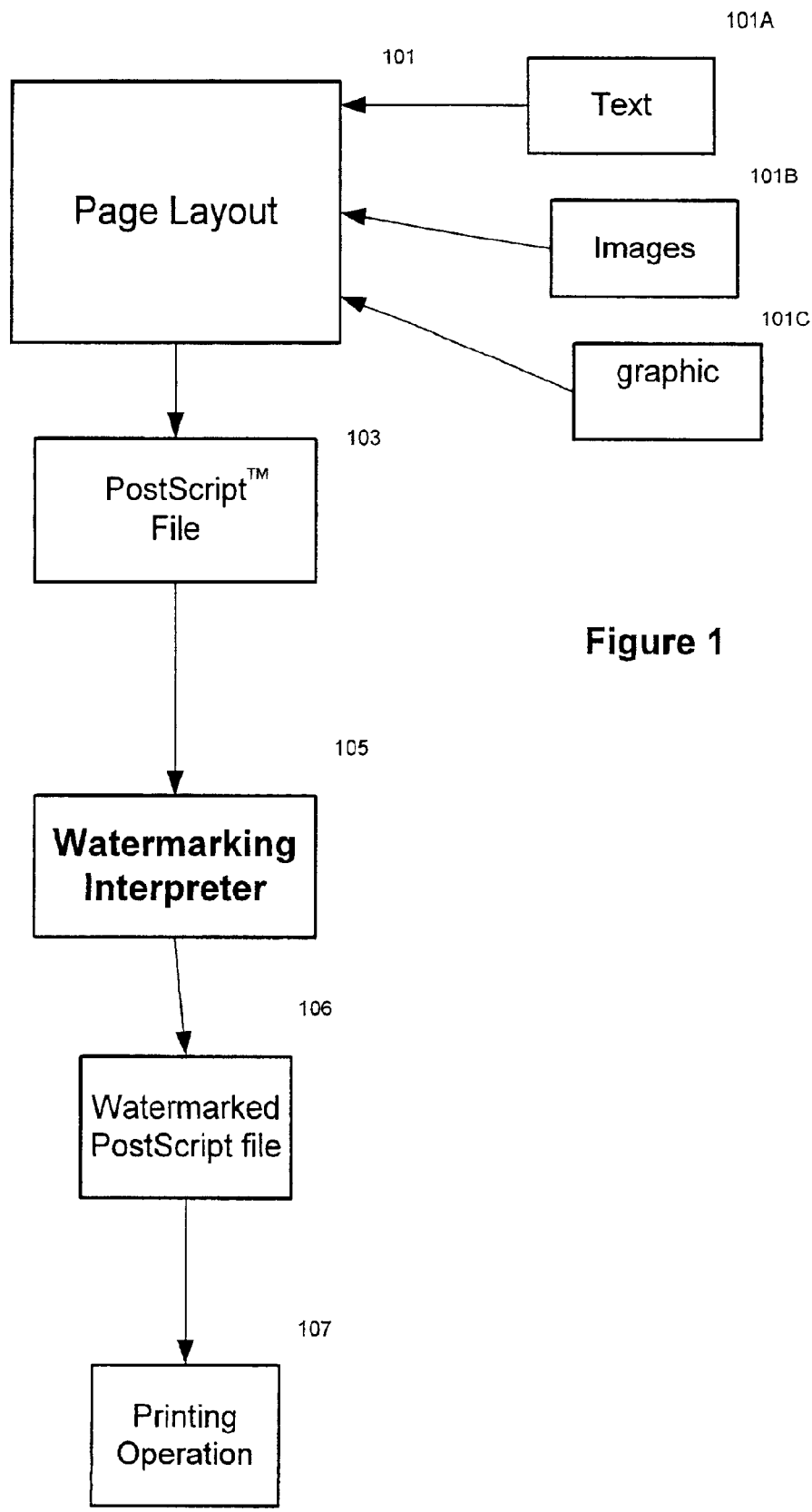
FIG. 1 is an overall flow diagram of the process.

The overall operation of the invention is illustrated in FIG. 1. The process begins as indicated by block 101. A page layout program such as PageMaker is used to generate a PostScript file 103. The page layout program combines text 101A, images 101B and graphics 101C with appropriate instructions and codes, to produce the desired lay out of a page. Such page layout is conventional and it results in a PostScript file 103. The PostScript file 103 is passed to a watermarking interpreter 105 which add an appropriate watermark and then generates a new watermarked PostScript file 106. The details of the watermarking interpreter are described below. Finally PostScript file 106 is provided to a printer which prints the desired page.

Figure 2:
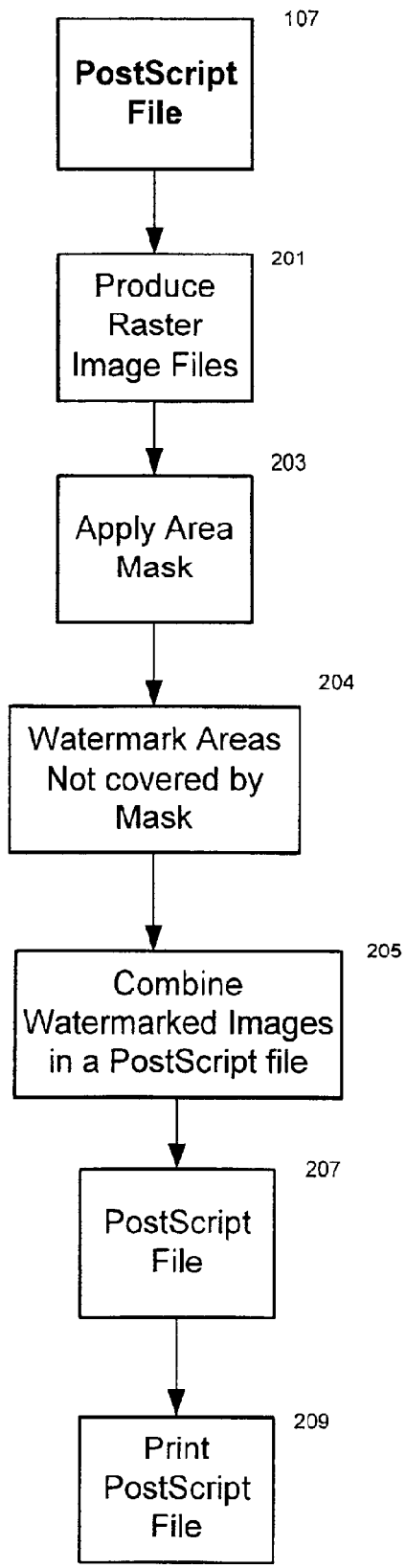
FIG. 2 is a flow diagram of the operation that take place in the watermark interpreter.

FIG. 2 illustrates the operations performed by the watermarking interpreter 105. First the watermarking interpreter generates the appropriate raster images as indicated by block 201. A conventional interpreter mechanism, such as that available in the Ghostscript interpreter can be used to generate the raster image files. A block diagram of such a mechanism is provided in FIG. 5. Next, as indicated by blocks 203 and 204, the areas in each raster image indicated by mask 401 (mask 401 is explained later) are watermarked. That is, the bits in the area indicated by mask 401 are watermarked using conventional watermarking technology. Next as indicated by block 205, the watermarked raster images are combined into a new postscript file 207. That is, a simple compiler program adds simple PostScript commands and combines the four raster images into a new PostScript file 207. Creating such a Postscript file from the four raster images uses conventional technology known in the art. Finally the PostScript file 207 is sent to a printer which prints the PostScript file using conventional technology. Naturally the file 207 may be stored on conventional storage mechanisms and electronically transmitted if desired prior to printing.

Figure 3:
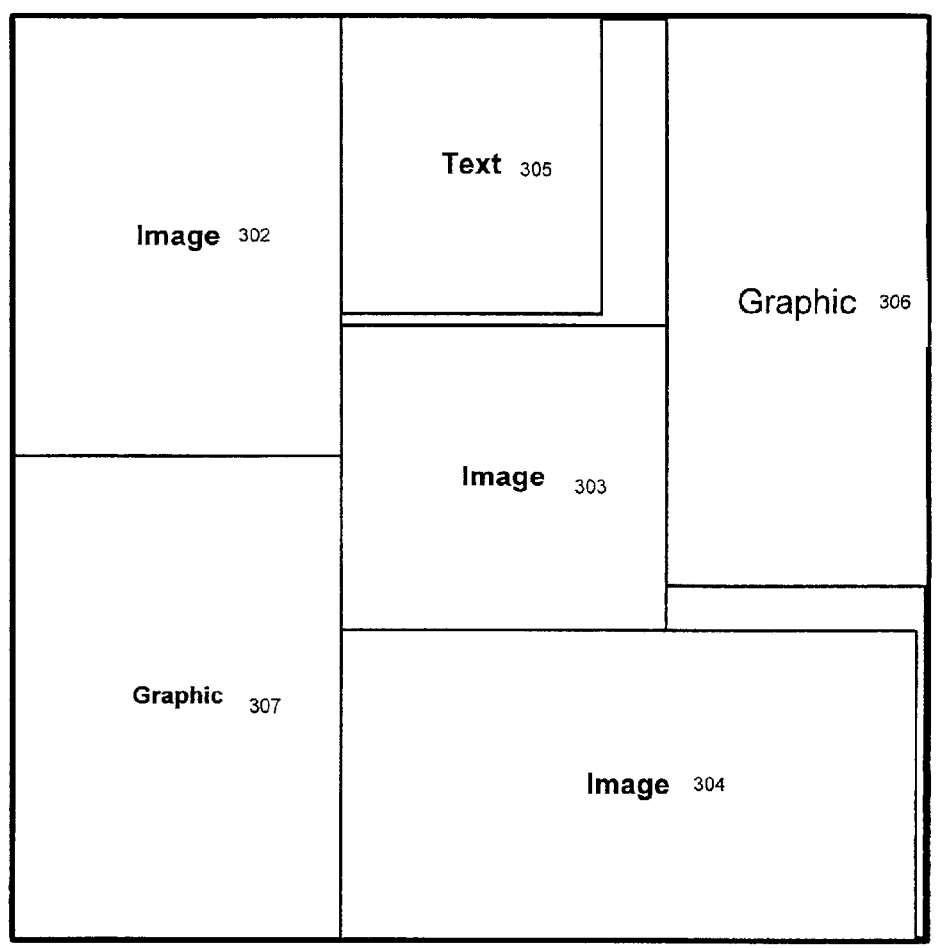
FIG. 3 is a block diagram of a PostScript Interpreter.

As indicated in FIG. 3, a printed page may contain a combination of images, text and graphics. The page shown in FIG. 3 includes images 302, 303, and 304, text 305 and graphics 306 and 307. It should be understood that the page illustrated is merely an example and a page may have a simple or complicated arrangement of text, images and graphics.

Figure 4:
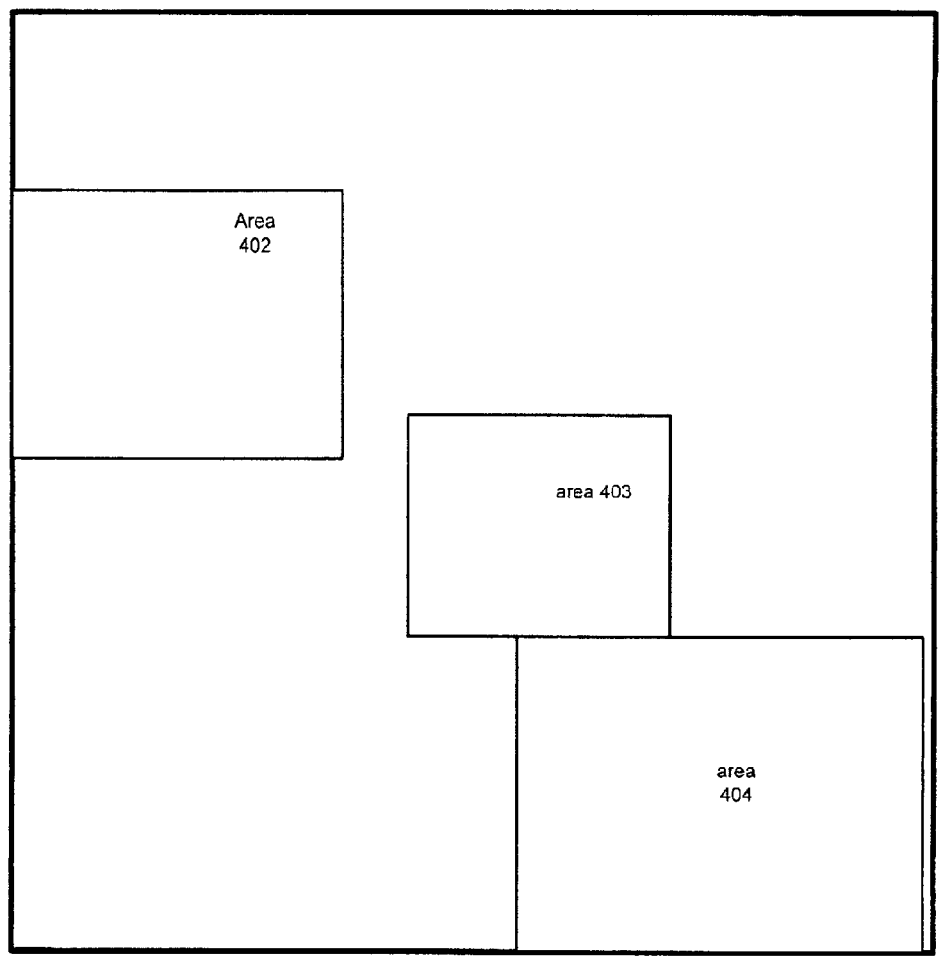
FIG. 4 shows a mask which defines areas in an image.

In order to avoid creating visual artifacts, it may be desirable to only watermark selected portions of a page. A mask such as that shown in FIG. 4 may be used. In the example shown the mask 401 indicates the areas where a watermarking signal should be applied. It should be understood that mask 401 is not a physical object. It is merely a designation of the areas in a page where a watermark should be applied. That is, areas where the pixels should be "tweaked" in order to apply a watermark to the page. Instead of showing areas where the page should be watermarked, the mask could alternatively show areas that should not be watermarked. The area selected for watermarking are generally areas where the application of a watermark signal will not materially degrade the image.

The raster image files are watermarked using conventional watermarking technology that specifies how various bits should be changed in order to embed a watermark. For example co-pending application Ser. No. 09/694,465 entitled "Watermarking an Image in Color Plane Separations and reading such watermarks" describes technology which could be used to watermark the raster images. The content of application Ser. No. 09/694,465 is hereby incorporated herein by reference.

Prior to changing any bit in one of the raster images, the mask 401 is interrogated to determine if the particular bit is in a location where it is desired to apply a watermark. If the particular bit is located in the area of mask 401 indicating that the area should be watermarked, the bit is changed, otherwise the bit is not changed.

Figure 5:
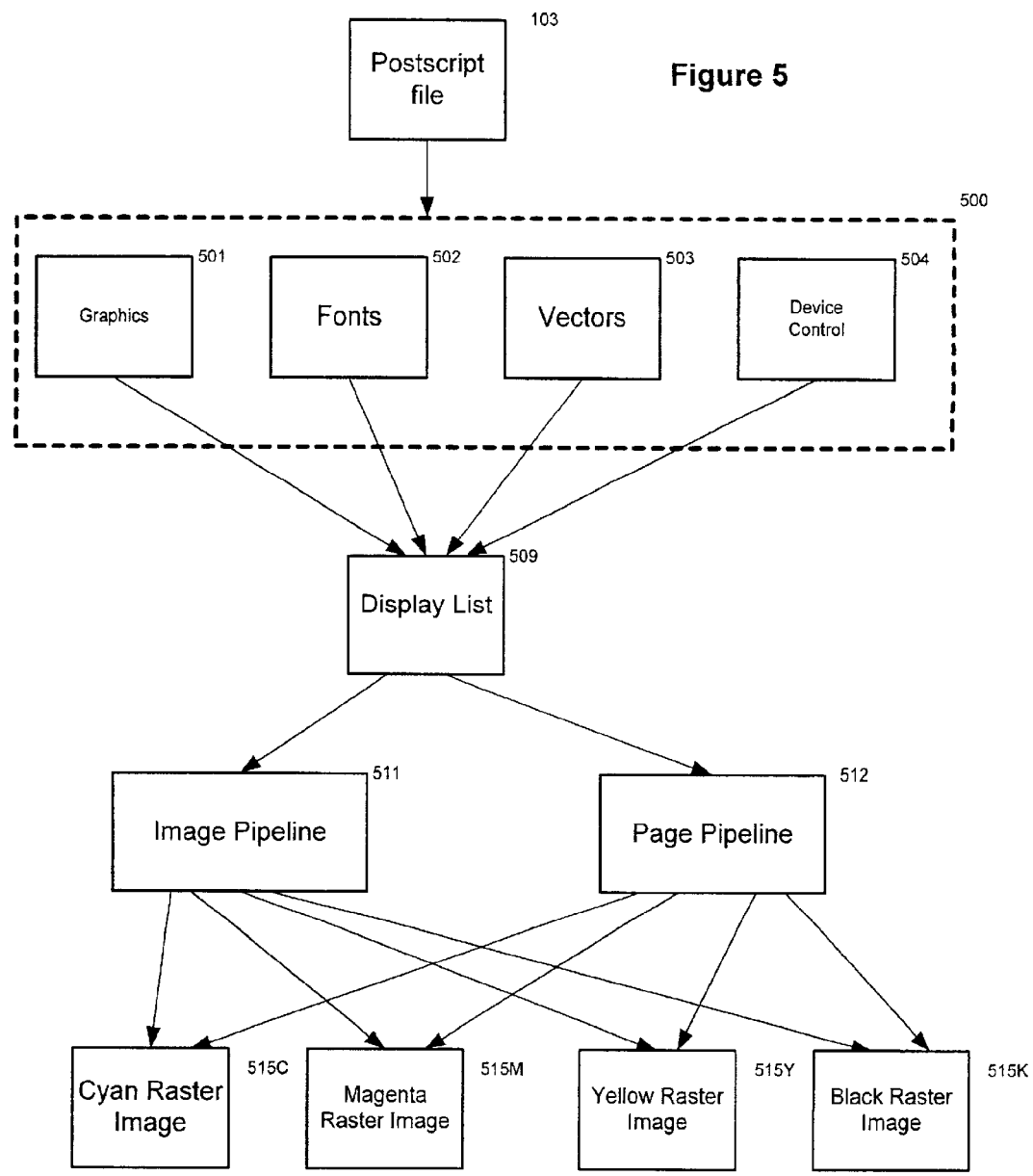
FIG. 5 is a block diagram of an interpreter.

A block diagram of the watermarking interpreter 105 is shown in FIG. 5. The watermarking interpreter 105 utilizes the well known components of the Ghostscript interpreter. Further details of the Ghostscript interpreter can be found in sources such as the "Ghostscript User Manual" by Thomas Merz (1996–97) which is widely available on the world wide web.

As indicated in FIG. 5 the interpreter takes the graphics 501, the fonts 502, the vectors 503 and the device controls 504 (there also may be other elements) and creates a display list 509. The display list provides information for an image pipeline 511 and a page pipeline 512. The output of pipelines 511 and 512 is the raster image files. In the example illustrated the raster images are CMYK images, 515C, 5165M, 515Y and 515K. Naturally in other environments these could be other types of raster images. The publicly available source code for the Ghostscript interpreter provides a mechanism for implementing the elements shown in FIG. 5.

Each of the raster images 515C to 516K are then watermarked as indicated in FIG. 2. This can be done as shown in co-pending application Ser. No. 09/694,465 entitled "Watermarking an Image in Color Plane Separations and reading such watermarks" which in incorporated herein by reference. These images are only watermarked in the areas indicated by mask 401. The result is four watermarked raster images.

In the preferred embodiment described above, the four watermarked raster images are combined into a PostScript file as indicated in FIG. 1. In an alternate embodiment, the watermarking interpreter is embedded in, and is part of a particular printer. In such an embodiment, the watermarked raster images would be sent directly to the printing mechanism as is conventional. Embedding an interpreter in printers is conventional. In such a case after the raster images are watermarked, they would be directly printed rather than being combined into another PostScript file.

It is also noted that in some situations only one raster image is generated and in some situation three, four or more raster images are generated. For example if the colors are RGB, three raster images are generated. In the situations where the printing utilizes hexachrome (i.e. spot colors) there would be six raster images. The term set is used to mean the number of raster images generated for the particular application.

While the invention has been shown and described with respect to various preferred embodiments, it should be understood that that various changes and alterations can be made without departing from the spirit and scope of the invention. The scope of the invention is limited only by the appended claims.

I claim:

1. A method of watermarking a file which is in a page description language (DPL) comprising:

interpreting said PDL file and generating a first set of raster images, watermarking each of said first set of raster images individually, combining the watermarked raster images into a second PDL file, interpreting said second file using an interpreter to generate a second set of raster images, and printing said second set of raster images.

2. The method recited in claim 1 wherein said PDL comprises PostScript.

3. The method recited in claim 1 wherein a mask is used to determine which areas of said first set of raster images are watermarked.

4. The method recited in claim 1 wherein each of said interpreting comprises a Ghostscript interpreter.

5. The method in claim 1 wherein said first set comprises four raster images.

6. A system for watermarking a file which is in a page description language (PDL) comprising:

an interpreter for interpreting said file and for generating a first set of raster images, a watermarking program for watermarking each of said first set of raster images individually, a compiler for combining said watermarked raster images into a second PDL file, an interpreter for interpreting said second PDL file and generating a second set of raster images, and printing said second set of raster images.

7. The system recited in claim 6 wherein said PDL comprises PostScript.

8. The system recited in claim 6 where wherein a mask is used to determine which areas of said first set of raster images are watermarked.

9. The system recited in claim 6 wherein said interpreters comprise a Ghostscript interpreter.

10. A method of watermarking a file which is in a page description language (PDL) comprising:

interpreting said PDL file, generating a set of raster images, watermarking each of said raster images individually, and printing said raster images.

11. The method recited in claim 10 wherein said PDL comprises PostScript.

12. The method recited in claim 10 wherein a mask is used to determine which areas of said raster images are watermarked.

13. The method recited in claim 10 wherein said interpreting comprise a Ghostscript interpreter.

14. A system for watermarking a file which is represented in a page description language (PDL), said method comprising:

an interpreter for interpreting said PDL file and generating a plurality of raster images, a watermarking program for watermarking each of said raster images individually and, a printer for printing said raster images.

15. The system recited in claim 14 wherein said PDL comprises PostScript.

16. The system recited in claim 14 wherein a mask is used to determine which areas of said raster images are watermarked.

17. The system recited in claim 14 wherein said interpreter comprises a Ghostscript interpreter.

* * * * *